United States Patent
Lee et al.

(10) Patent No.: US 11,157,264 B2
(45) Date of Patent: Oct. 26, 2021

(54) ELECTRONIC DEVICE AND METHOD FOR CONTROLLING UPDATE OF ELECTRONIC DEVICE

(71) Applicant: Samsung Electronics Co., Ltd., Suwon-si (KR)

(72) Inventors: Jongho Lee, Suwon-si (KR); Heechae Yoon, Suwon-si (KR); Byungchul Kim, Suwon-si (KR); Jiseong Lee, Suwon-si (KR); Junghoon Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/981,489

(22) PCT Filed: Mar. 19, 2019

(86) PCT No.: PCT/KR2019/003202
§ 371 (c)(1),
(2) Date: Sep. 16, 2020

(87) PCT Pub. No.: WO2019/182335
PCT Pub. Date: Sep. 26, 2019

(65) Prior Publication Data
US 2021/0034354 A1 Feb. 4, 2021

(30) Foreign Application Priority Data
Mar. 19, 2018 (KR) .......... 10-2018-0031732

(51) Int. Cl.
*G06F 8/65* (2018.01)
*G06F 8/71* (2018.01)
(Continued)

(52) U.S. Cl.
CPC .......... *G06F 8/65* (2013.01); *G06F 8/71* (2013.01); *G06F 9/4406* (2013.01); *G06F 12/0646* (2013.01)

(58) Field of Classification Search
CPC . G06F 8/65; G06F 8/71; G06F 9/4406; G06F 12/0646; G06F 8/658; G06F 21/572
See application file for complete search history.

(56) References Cited

U.S. PATENT DOCUMENTS

2007/0011670 A1* 1/2007 Nguyen ............ G06F 8/65 717/168
2010/0235617 A1 9/2010 Chen
(Continued)

FOREIGN PATENT DOCUMENTS

JP 2016-126443 A 7/2016
KR 10-2006-0025854 A 3/2006
(Continued)

OTHER PUBLICATIONS

Wentao Shang et al.; A Survey of Distributed Dataset Synchronization in Named Data Networking; NDN; 11 pages; retrieved on Jun. 10, 2021 (Year: 2017).*
(Continued)

Primary Examiner — S. Sough
Assistant Examiner — Cuong V Luu
(74) Attorney, Agent, or Firm — Jefferson IP Law, LLP

(57) ABSTRACT

An electronic device is provided. The electronic device includes a first memory including a boot area, a kernel area, and a recovery area, a second memory configured to load data corresponding to at least one from among the boot area, the kernel area, and the recovery area included in the first memory, a communication module, and a processor electrically connected to the communication module, the first memory, and the second memory. The first memory includes
(Continued)

instructions that cause, when executed, the processor to download data in the first memory through the communication module, when there is a request for updating the downloaded data, perform rebooting, when performing the rebooting, confirm whether a new version of recovery data is included in the downloaded data, and when the new version of recovery data is included in the data, update the downloaded data on the basis of the new version of recovery data.

13 Claims, 12 Drawing Sheets

(51) Int. Cl.
*G06F 9/4401* (2018.01)
*G06F 12/06* (2006.01)

(56) References Cited

U.S. PATENT DOCUMENTS

| | | |
|---|---|---|
| 2013/0332647 A1 | 12/2013 | Rabeler et al. |
| 2016/0188430 A1 | 6/2016 | Nitta |
| 2016/0231804 A1* | 8/2016 | Bulusu ................ G06F 9/4401 |
| 2017/0243007 A1 | 8/2017 | Djabarov et al. |

FOREIGN PATENT DOCUMENTS

| | | |
|---|---|---|
| KR | 10-2013-0138635 A | 12/2013 |
| KR | 10-2016-0039287 A | 4/2016 |

OTHER PUBLICATIONS

Michael Isard; Autopilot Automatic Data Center Management; ACM; pp. 60-67; retrieved on Jun. 10, 2021 (Year: 2007).*

* cited by examiner

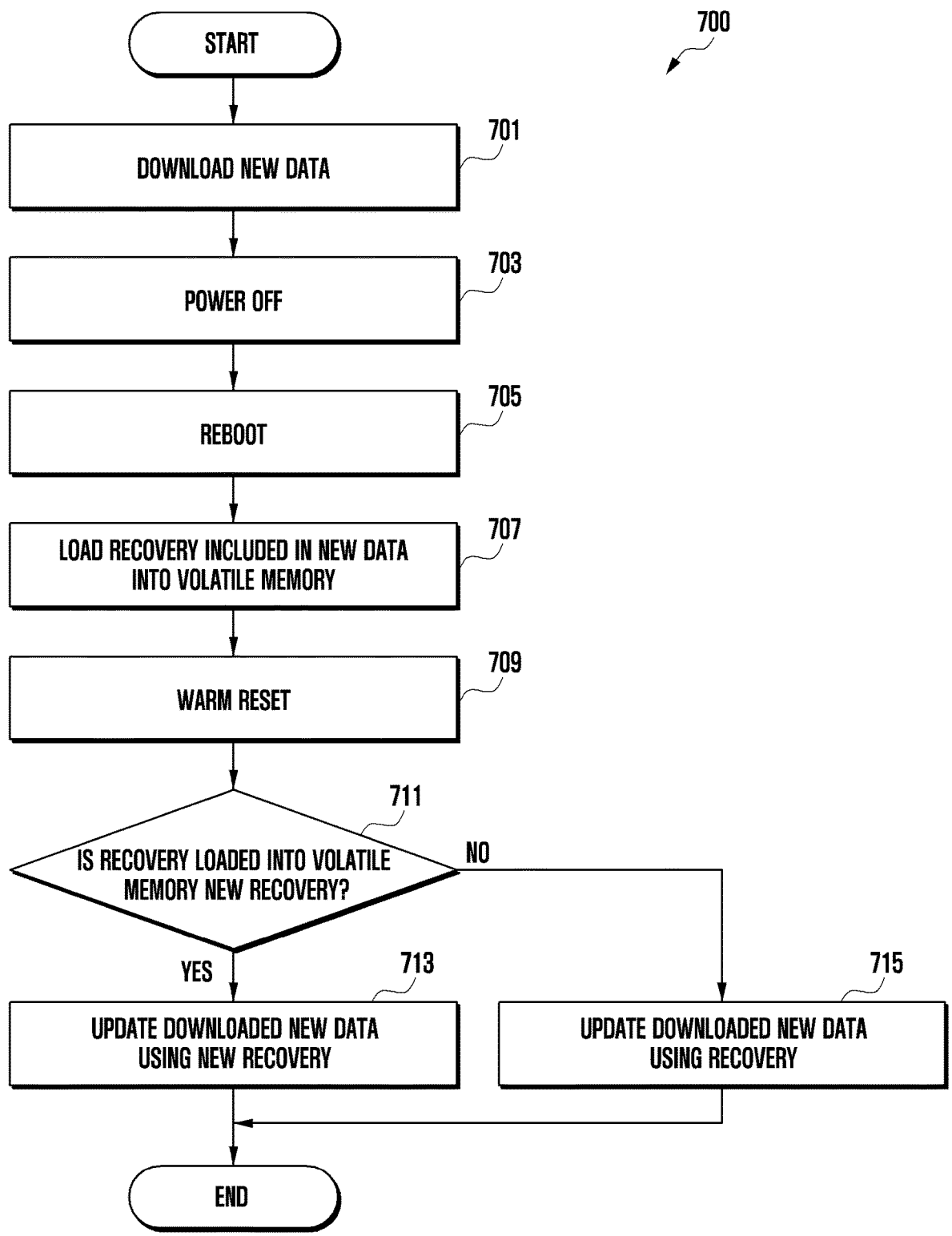

ELECTRONIC DEVICE AND METHOD FOR CONTROLLING UPDATE OF ELECTRONIC DEVICE

TECHNICAL FIELD

Various embodiments of the disclosure relates to a method for controlling update of an electronic device and an electronic device.

BACKGROUND ART

Due to rapid technological development, portable electronic devices, such as a smartphone, enable use of various functions, such as a video call, an electronic organizer, and an Internet function, in addition to initial simple functions including a voice call and short message transmission. Generally, when a new version of a program different from a previous version of the program is developed, a portable electronic device may need to update data of the new version of the program in order to solve problems caused by using the previous version of the program.

A portable electronic device requiring data update may connect to a server supporting binary update of an electronic device, may download a new version of data from the connected server, and may perform update based on the downloaded data. For example, manufacturers of portable electronic devices provide data for updating functions and programs based on firmware over the air (FOTA) in order to minimize user control in relation to data update. According to an FOTA-based update process, a portable electronic device may connect to a server supporting binary update, may receive new data (e.g., updated data) from the connected server, and may update data based on the received new data upon rebooting. Generally, FOTA-based update may use a recovery kernel to update new data. FOTA performed based on the Google operating system may be referred to as GOTA (e.g., Google FOTA).

DISCLOSURE OF INVENTION

Technical Problem

Generally, an update process of an electronic device according to FOTA uses a previous version of a recovery kernel in a data update process. When a portable electronic device updates data using a recovery kernel in a previous version, an error may occur in data update due to a defect of the recovery kernel in the previous version. In addition, the portable electronic device may have a problem in compatibility between the recovery kernel in the previous version and the data to be updated, which may make it difficult to update data.

Various embodiments of the disclosure may provide a process for updating data using a new version of a recovery kernel (e.g., a new recovery kernel) rather than a previous version of the recovery kernel in a process for updating an electronic device.

Solution to Problem

An electronic device according to various embodiments of the disclosure may include: a first memory configured to include a boot area, a kernel area, and a recovery area; a second memory configured to load data corresponding to at least one of the boot area, the kernel area, and the recovery area included in the first memory; a communication module; and a processor configured to be electrically connected to the communication module, the first memory, and the second memory, wherein the first memory may be executed to cause the processor to: download data to the first memory through the communication module; perform rebooting upon request for update of the downloaded data; identify whether the downloaded data includes recovery data in a new version in the rebooting; and update the downloaded data based on the recovery data in the new version when the data includes the recovery data in the new version.

A method for controlling update of an electronic device according to various embodiments of the disclosure may: download data from a server based on a first memory; perform rebooting upon request for update of the downloaded data; identify whether the downloaded data includes recovery data in a new version in the rebooting; and update the downloaded data based on the recovery data in the new version when the data includes the recovery data in the new version.

A computer-readable recording medium that stores a program to execute a method for controlling update of an electronic device in a computer according to various embodiments of the disclosure may store a program to perform a method including: downloading data from a server based on a first memory; performing rebooting of the electronic device upon request for update of the downloaded data; identifying whether the downloaded data includes recovery data in a new version in the rebooting; and updating the downloaded data based on the recovery data in the new version when the data includes the recovery data in the new version.

Advantageous Effects of Invention

According to various embodiments of the disclosure, data in a new version may be updated based on a recovery kernel in a new version rather than a recovery kernel in a previous version, thus reducing errors in a data update process. According to various embodiments of the disclosure, it is possible to reduce unnecessarily repeated processes in a data update process, thus quickly and easily updating data. According to various embodiments of the disclosure, user convenience may be improved.

BRIEF DESCRIPTION OF DRAWINGS

FIG. 7 is a flowchart specifically illustrating a method for dealing with a case where power is off during FOTA update of an electronic device according to various embodiments of the disclosure.

MODE FOR THE INVENTION

Figure 1:
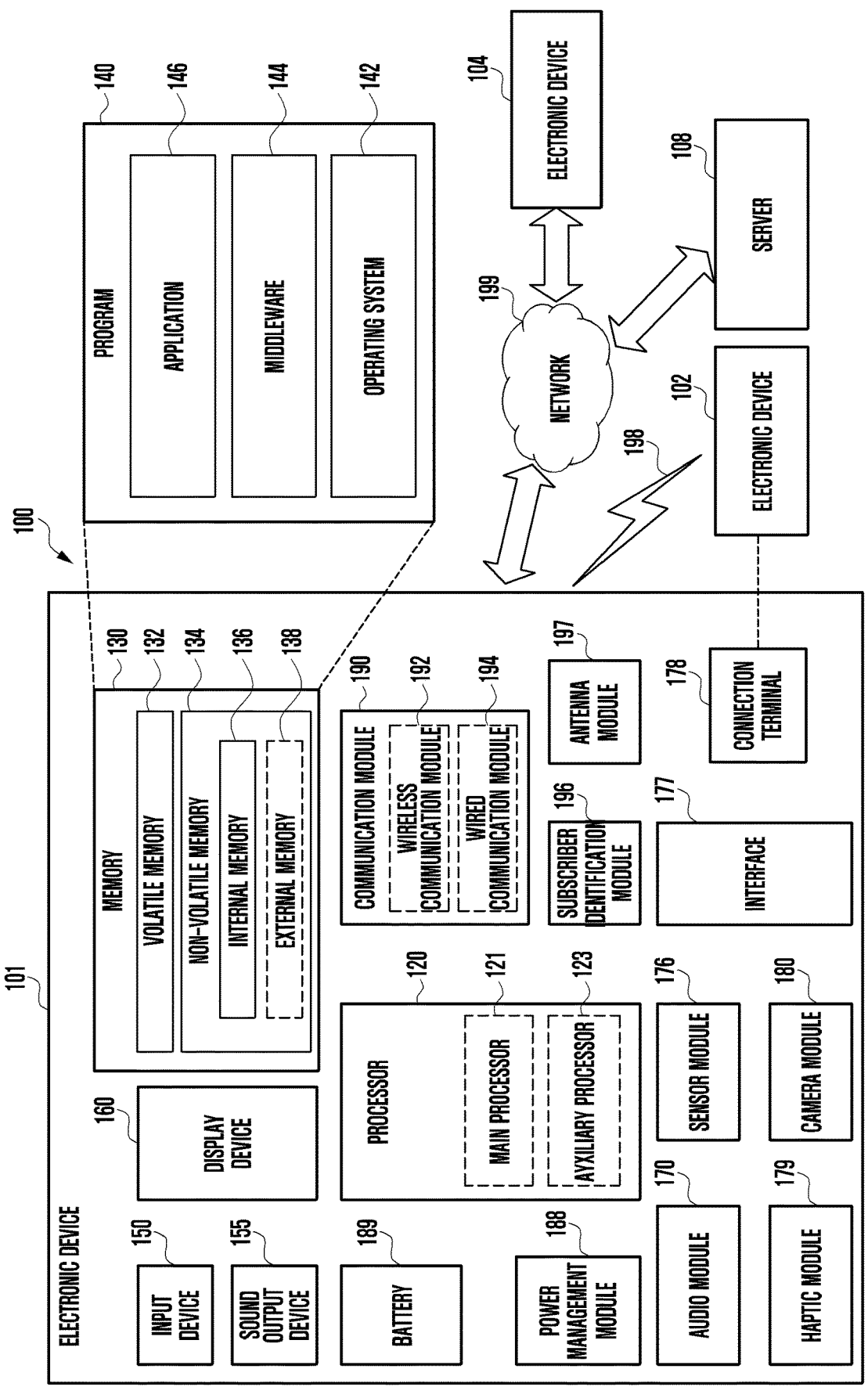
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 (e.g., DRAM, SRAM, or SDRAM) or the non-volatile memory 134. The nonvolatile memory 134 may be divided into an internal memory 136 and an external memory 138. For example, the internal memory 136 included in the nonvolatile memory 134 may include at least one of a one-time programmable ROM (OTPROM), a PROM, an EPROM, an EEPROM, a mask ROM, a flash ROM, a flash memory, a hard drive, a universal flash storage (UFS), and a solid-state drive (SSD). The external memory 138 included in the nonvolatile memory 134 may include a flash drive, a compact flash (CF), a secure digital (SD), a micro-SD, a mini-SD, an extreme digital (xD), a multi-media card (MMC), an embedded multi-media card (eMMC), or a memory stick. The external memory 138 may be functionally or physically connected to the electronic device 101 through various interfaces.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 (e.g., DRAM, SRAM, or SDRAM) or the non-volatile memory 134.

The program 140 may be stored as software in the memory 130 and may include, for example, an operating system 142, middleware 144, an application 146 (e.g., an application program), and/or a kernel 148. According to various embodiments, the operating system 142 may be an operation system, and at least some of the middleware 144, the application 146, and the kernel 148 may be included in the operation system. The kernel 148 may control or manage system resources (e.g., the processor 120 or the memory 130) used to perform an operation or function implemented, for example, in other programs (e.g., the operating system 142, the middleware 144, or the application 146). Further, the kernel 148 may provide an interface that enables the operating system 142, the middleware 144, and/or the application 146 to access individual components of the electronic device 101 to thereby control or manage system resources. According to various embodiments, the kernel 148 may be an Android-based Linux kernel and may manage data, such as a memory and a task. The kernel 148 may include an LCD driver, an audio driver, a graphic driver, and the like. Although not shown, the kernel 148 may include a recovery kernel, and the recovery kernel may be a Linux kernel to perform data update according to FOTA. Although the recovery kernel is designated separately from the kernel 148, the recovery kernel may be included in the kernel 148 according to an embodiment. Hereinafter, the recovery kernel may refer to recovery or recovery data.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
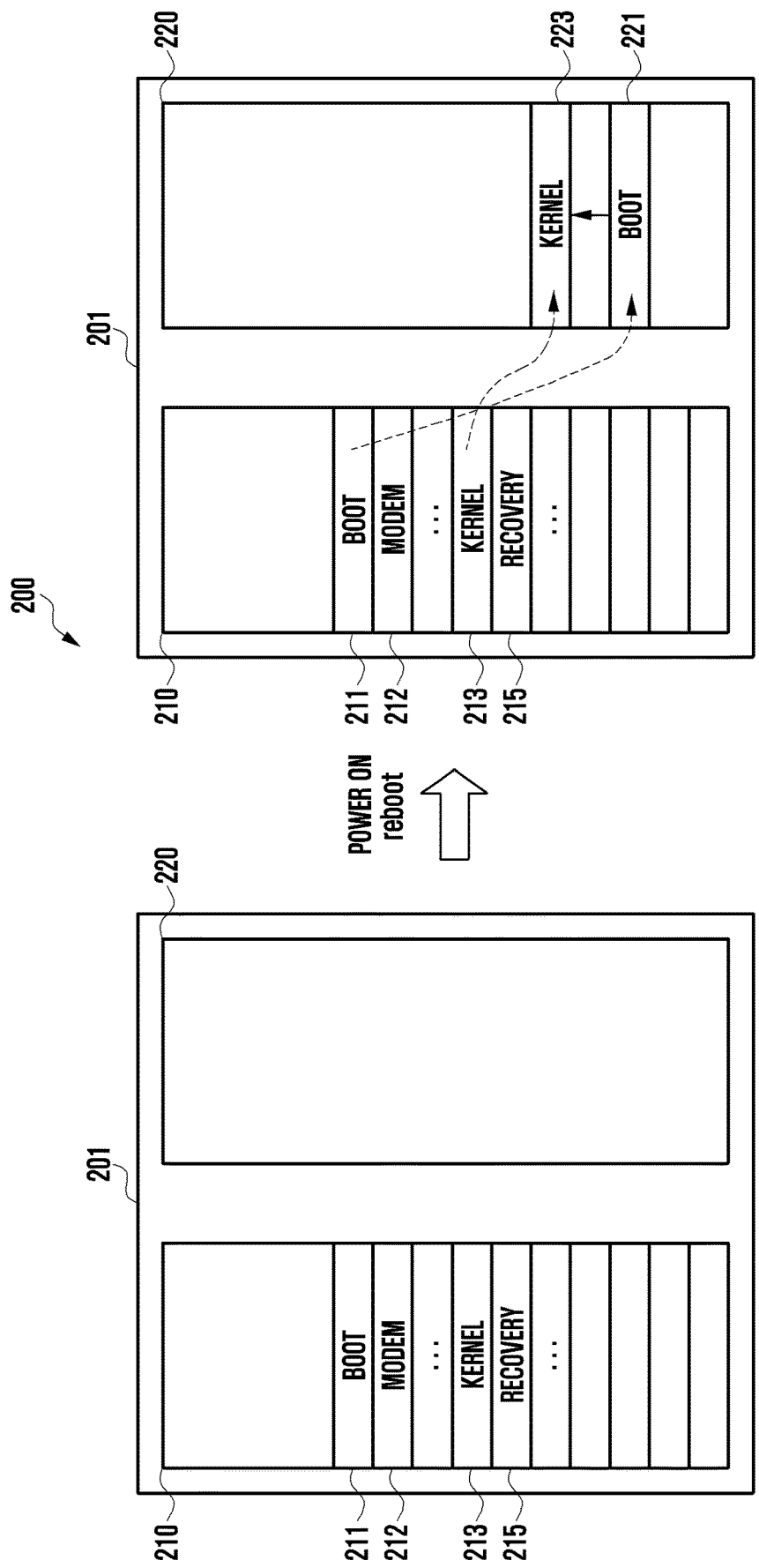
FIG. 2A and FIG. 2B are diagrams illustrating a booting method of an electronic device and an FOTA update method of an electronic device according to various embodiments of the disclosure.
Figure 2B:
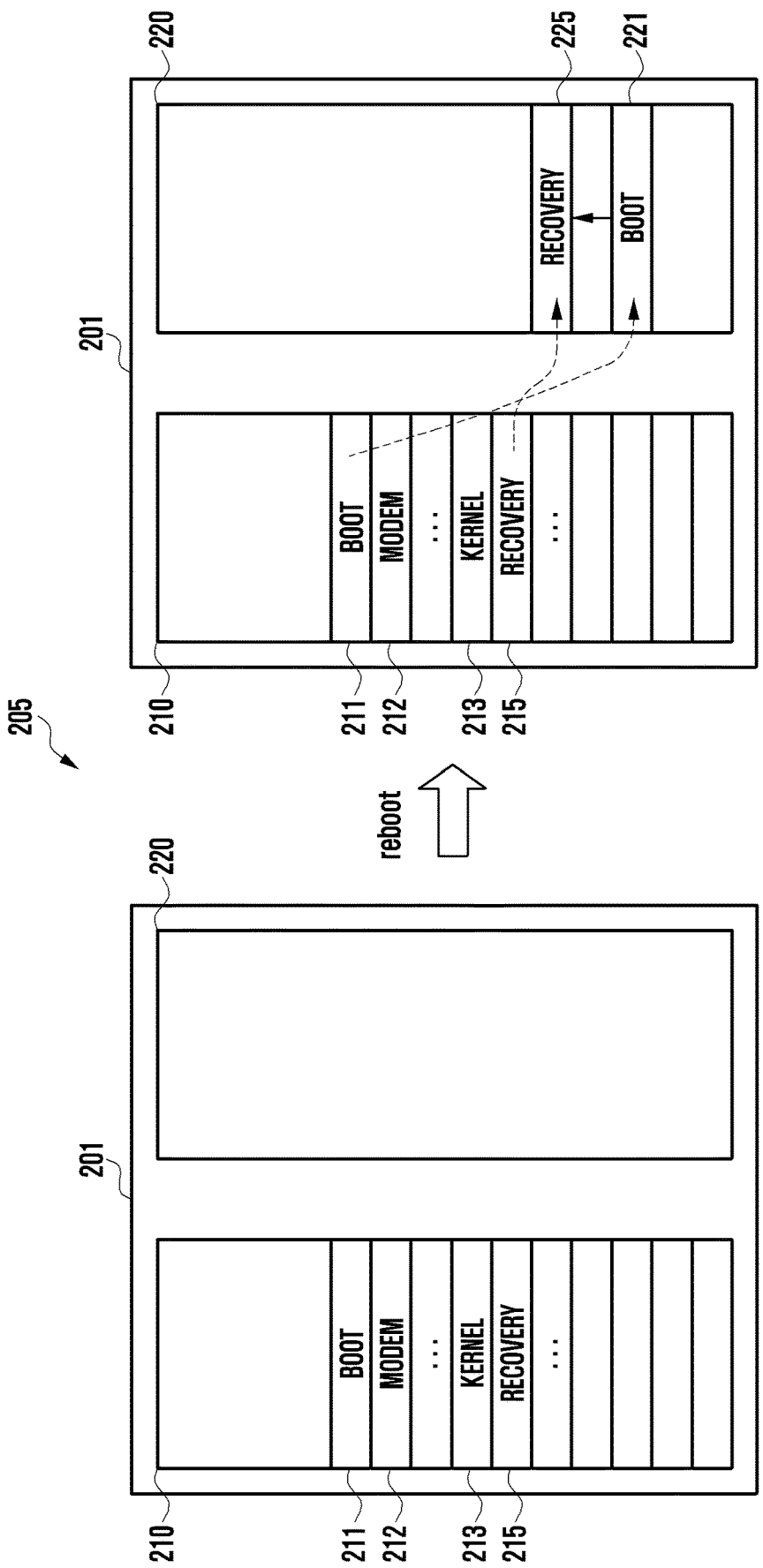

FIG. 2A and FIG. 2B are diagrams illustrating a booting method of an electronic device and an FOTA update method of an electronic device according to various embodiments of the disclosure.

FIG. 2A is a diagram 200 illustrating a booting method of an electronic device. According to various embodiments, the electronic device 201 (e.g., the electronic device 101 of FIG. 1) may include software (e.g., a program) and a memory (e.g., the memory 130 of FIG. 1) to store input data or output data for commands relating to the software. The memory may be divided into a nonvolatile memory 210 (e.g., the nonvolatile memory 134 of FIG. 1) and a volatile memory 220 (e.g., the volatile memory 132 of FIG. 1).

According to various embodiments, the electronic device 201 may store a boot 211 (e.g., a bootloader), a modem 212, a kernel 213, a recovery 215 (e.g., a recovery kernel, hereinafter, a recovery refers to a recovery kernel), and a system (not shown) in the nonvolatile memory 210 (e.g., the nonvolatile memory 134 of FIG. 1). In the following description, the kernel 213 and the recovery 215 are divided, but the recovery 215 may be one type of the kernel 213.

Referring to FIG. 2A, when the electronic device 201 is powered on and boots or reboots, a processor (e.g., the processor 120 of FIG. 1) of the electronic device 201 may load the boot 211 (e.g. the boot loader) and the kernel 213, stored in the nonvolatile memory 210 (e.g. a UFS or an eMMC), into the volatile memory 220 (e.g. an RAM). In the booting process, the processor 120 may load the boot 211 and the kernel 213 into the volatile memory 220 and may manage a system resource or may initialize a driver through the loaded boot 221 and kernel 223.

FIG. 2B is a diagram 205 illustrating an FOTA update method of an electronic device. Referring to FIG. 2B, the electronic device 201 may store the boot 211, the modem 212, the kernel 213, the recovery 215, and the system (not shown) in the nonvolatile memory 210. Although not shown, the electronic device 201 may download new data (e.g., updated data to be updated, delta) through a server and may reboot to update the downloaded new data. When the electronic device 201 reboots for FOTA update, the processor 120 of the electronic device 201 may load the boot 211 (e.g. the boot loader) and the recovery 215, stored in the nonvolatile memory 210 (e.g., the UFS or eMMC) into the volatile memory 220 (e.g., the RAM). In the FOTA update process, the processor 120 may update the downloaded new data through the boot 221 and the recovery 225 loaded into the volatile memory 220.

Figure 3A:
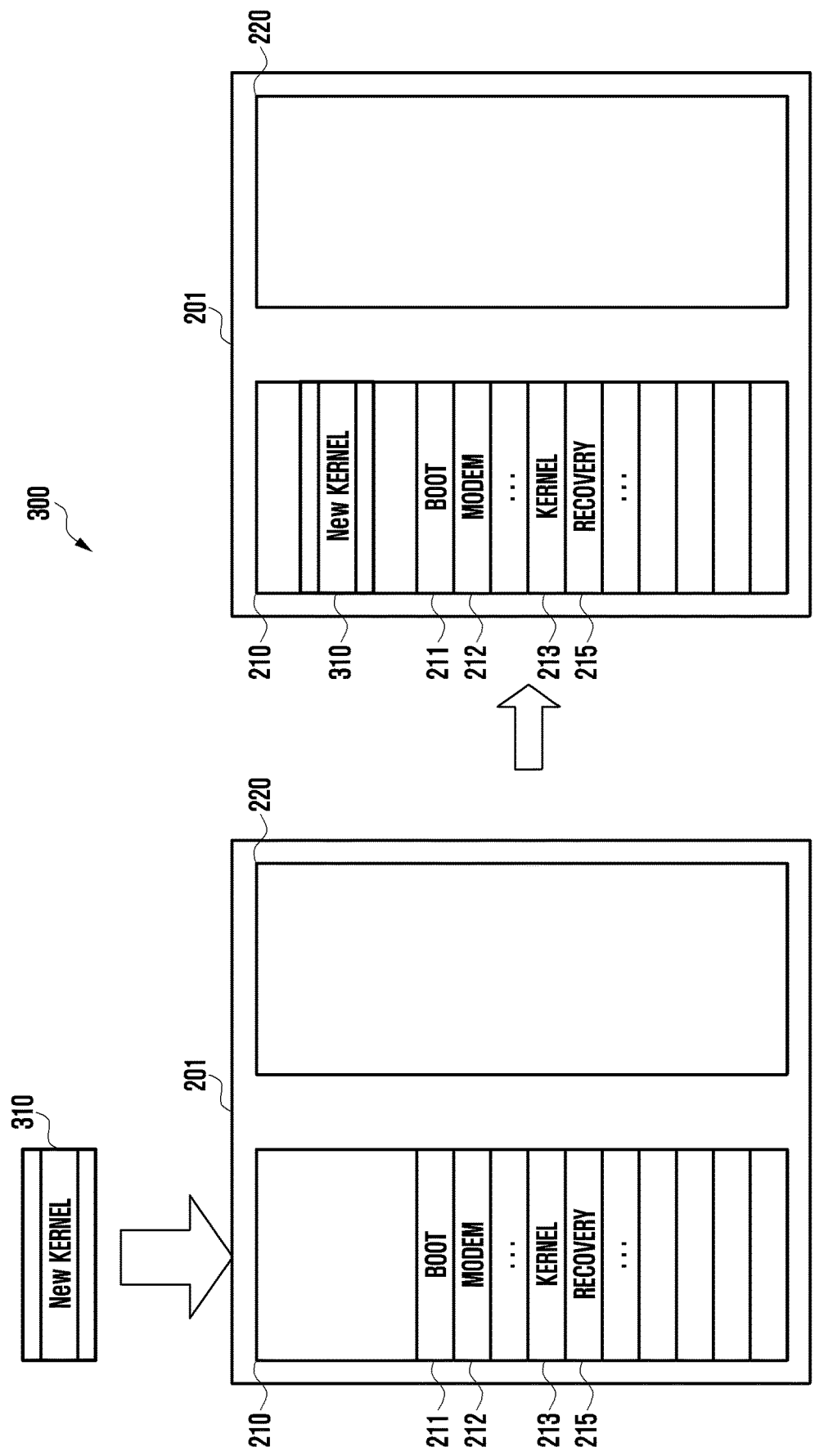
FIG. 3A to FIG. 3C are diagrams illustrating an FOTA update method of an electronic device according to various embodiments.
Figure 3B:
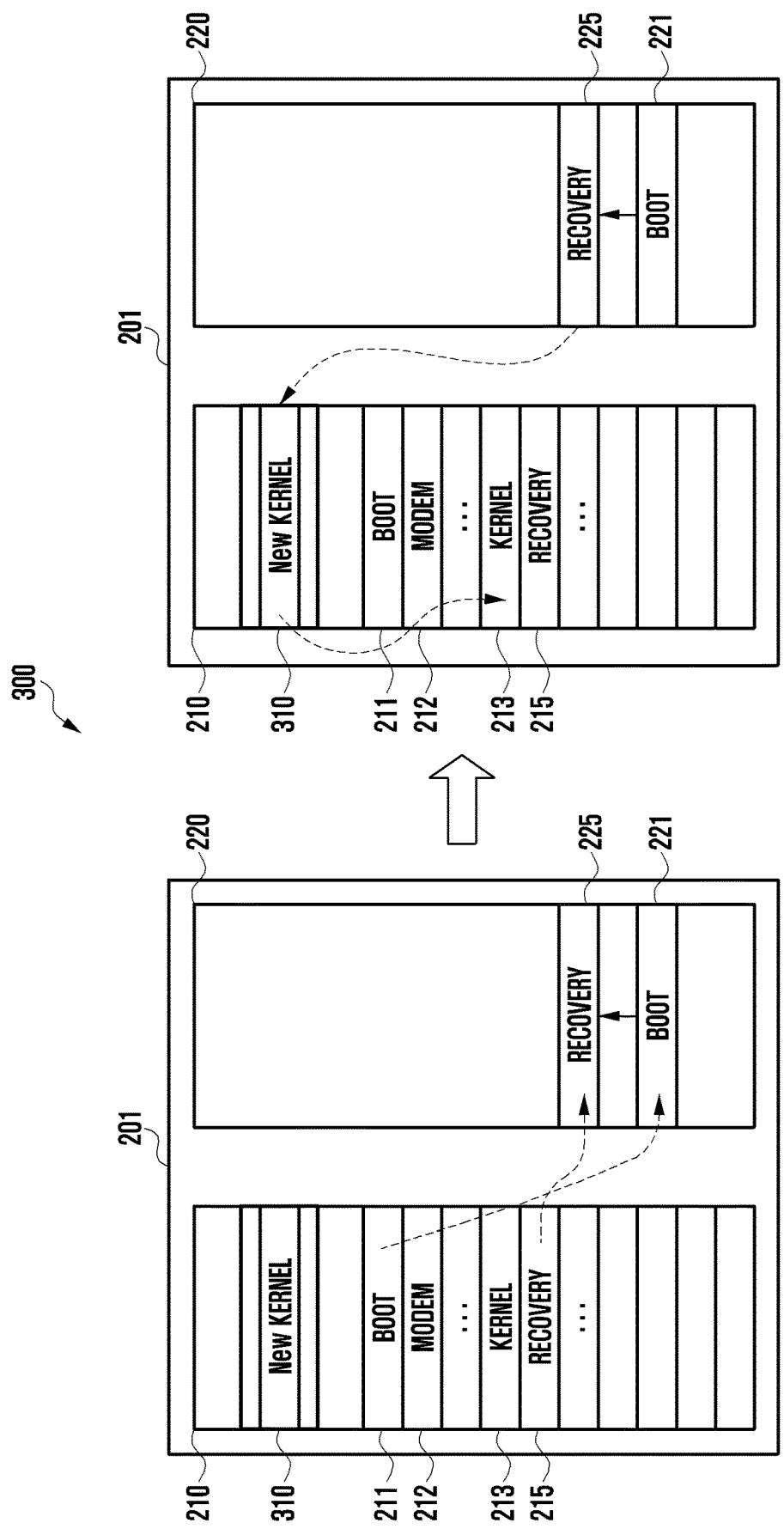
Figure 3C:
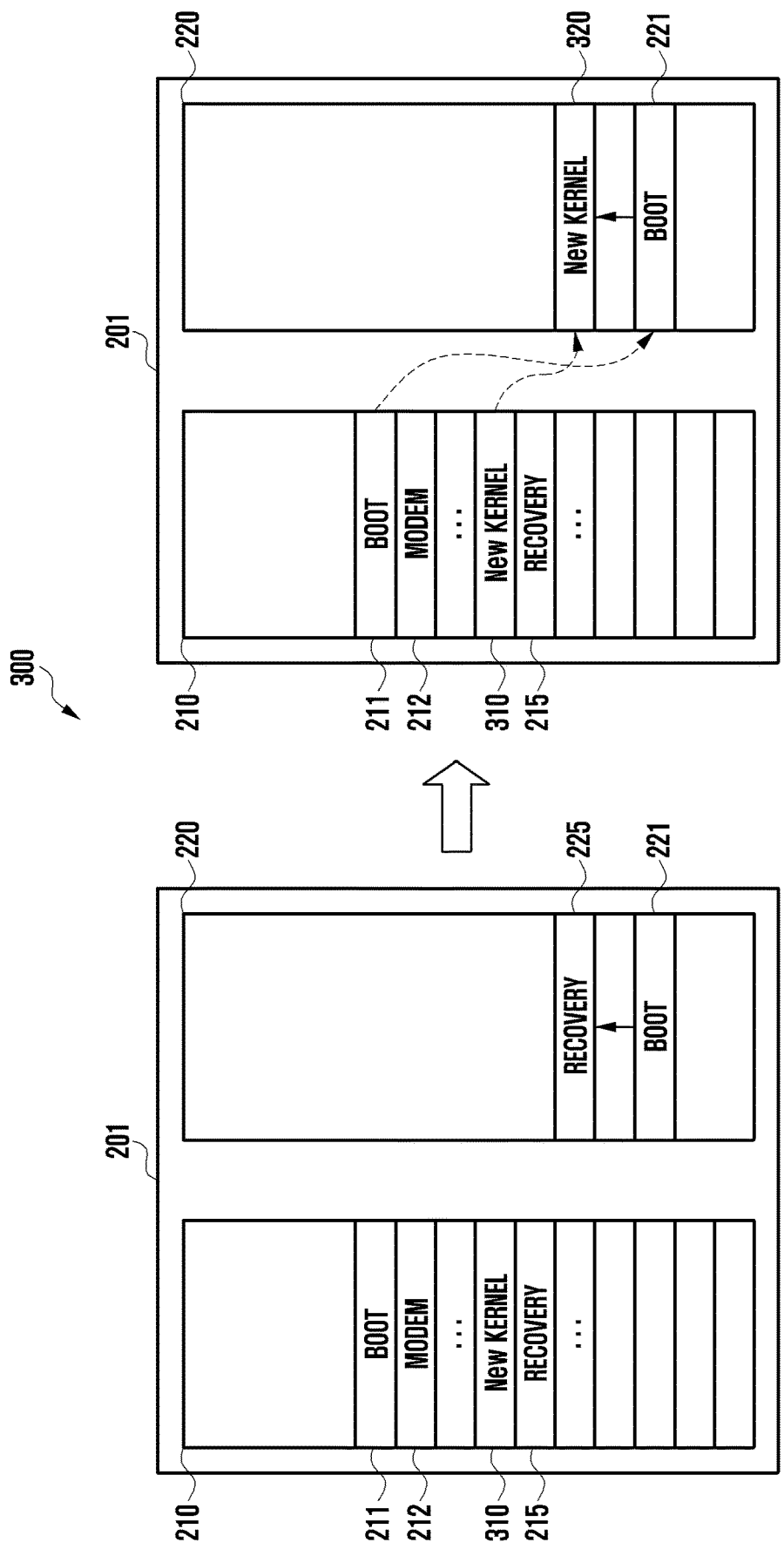

FIG. 3A to FIG. 3C are diagrams 300 illustrating an FOTA update method of an electronic device according to various embodiments. FIG. 3A to FIG. 3C illustrate the FOTA update method of the electronic device illustrated in FIG. 2B in detail.

Referring to FIG. 3A, a processor (e.g., the processor 120 of FIG. 1) of the electronic device 201 (e.g., the electronic device 101 of FIG. 1) may download a new kernel 310 (e.g., a kernel in a new version) from a server (e.g., a server supporting binary update, for example, the server 108 of FIG. 1). The processor 120 may store the downloaded new kernel 310 in a nonvolatile memory 210 (e.g., the nonvolatile memory 210 of FIG. 2A or FIG. 2B).

Referring to FIG. 3B, the processor 120 of the electronic device 201 may reboot to update the downloaded new kernel 310. In rebooting, the processor 120 may load a boot 211 and a recovery 215, which are stored in the nonvolatile memory 210, into a volatile memory 220. The processor 120 may update the downloaded new kernel 310 through the loaded boot 221 and recovery 225. For example, the processor 120 may update a kernel 213 stored in the nonvolatile memory 210 to the new kernel 310.

Referring to FIG. 3C, the electronic device 201 may reboot to complete FOTA update. In rebooting, the electronic device 201 may load the boot 211 and the updated new kernel 310 into the volatile memory 220, and may boot based on the loaded boot 221 and new kernel 320.

Figure 4:
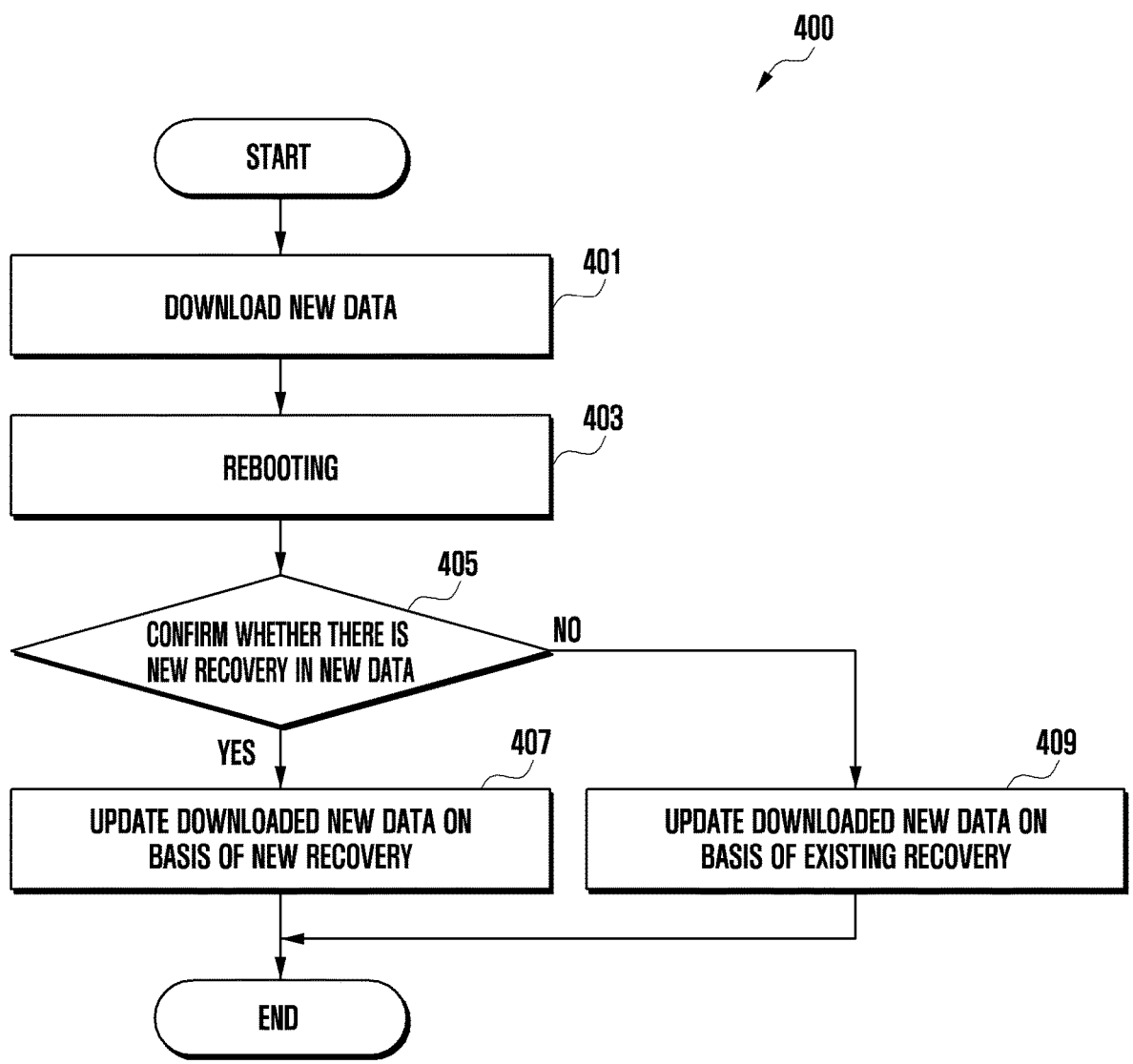
FIG. 4 is a flowchart illustrating a method for controlling FOTA update of an electronic device according to various embodiments of the disclosure.

FIG. 4 is a flowchart 400 illustrating a method for controlling FOTA update of an electronic device according to various embodiments.

Referring to FIG. 4, in operation 401, a processor (e.g., the processor 120 of FIG. 1) of the electronic device (e.g., the electronic device 101 of FIG. 1) may download new data from a server (e.g., a server supporting binary update, for example, the server 108 of FIG. 1). For example, the new data may include a new version of data previously stored in a memory (e.g., the memory 130 of FIG. 1), newly added data, and data about a new FOTA engine. The processor 120 may download the new data and may store the new data in the memory (e.g., a nonvolatile memory, for example, the nonvolatile memory 134 of FIG. 1).

In operation 403, the processor 120 may reboot to update the downloaded new data.

In operation 405, the processor 120 may identify whether a new FOTA engine is included in the new data. Specifically, to update the new data, the processor 120 may load a recovery stored in the nonvolatile memory 134 into a volatile memory (e.g., the volatile memory 132 of FIG. 1) and may identify whether the new FOTA engine is included in the new data through the loaded recovery. For example, when a new kernel file, a ramdisk-recovery.img file, and a dt.img file are included in the new data, the processor 120 may determine that the new FOTA engine is included in the new data.

When the new FOTA engine is included in the new data in operation 405, the processor 120 may load a new recovery corresponding to the new FOTA engine and may update the new data through the loaded new recovery. In operation 407, the processor 120 may update the new data, downloaded in operation 401, based on the new FOTA engine.

When no new FOTA engine is included in the new data in operation 405, the processor 120 may load a recovery corresponding to a previously stored FOTA engine and may update the new data, downloaded in operation 401, through the loaded recovery in operation 409.

According to various embodiments of the disclosure, the electronic device 101 may download new data from the server 108 and may be rebooted in order to update the new data. In the rebooting process, the electronic device 101 may identify whether a new FOTA engine is included in the new data, and may load a new recovery corresponding to the new FOTA engine when a new FOTA engine is included in the new data. The electronic device 101 may update the new data through the new recovery.

According to various embodiments of the disclosure, since the electronic device 101 updates new data based on a new recovery, it is possible to reduce errors in the data update process. For example, when the new data is updated based on an existing recovery, a problem may occur in compatibility between the recovery and the new data, and the electronic device 101 may fail to update the new data. Generally, in updating new data, the electronic device 101 does not perform a process of identifying whether a new FOTA engine is included in the new data (e.g., operation 405 of FIG. 4). The electronic device 101 may update the new data based on the existing recovery, but an update error may occur. As the electronic device 101 is rebooted again in the existing recovery-based update process, user convenience may be deteriorated. According to various embodiments of the disclosure, since the electronic device 101 updates new data based on a new recovery, update errors may be reduced, and rebooting may be minimized, thus improving user convenience.

Figure 5A:
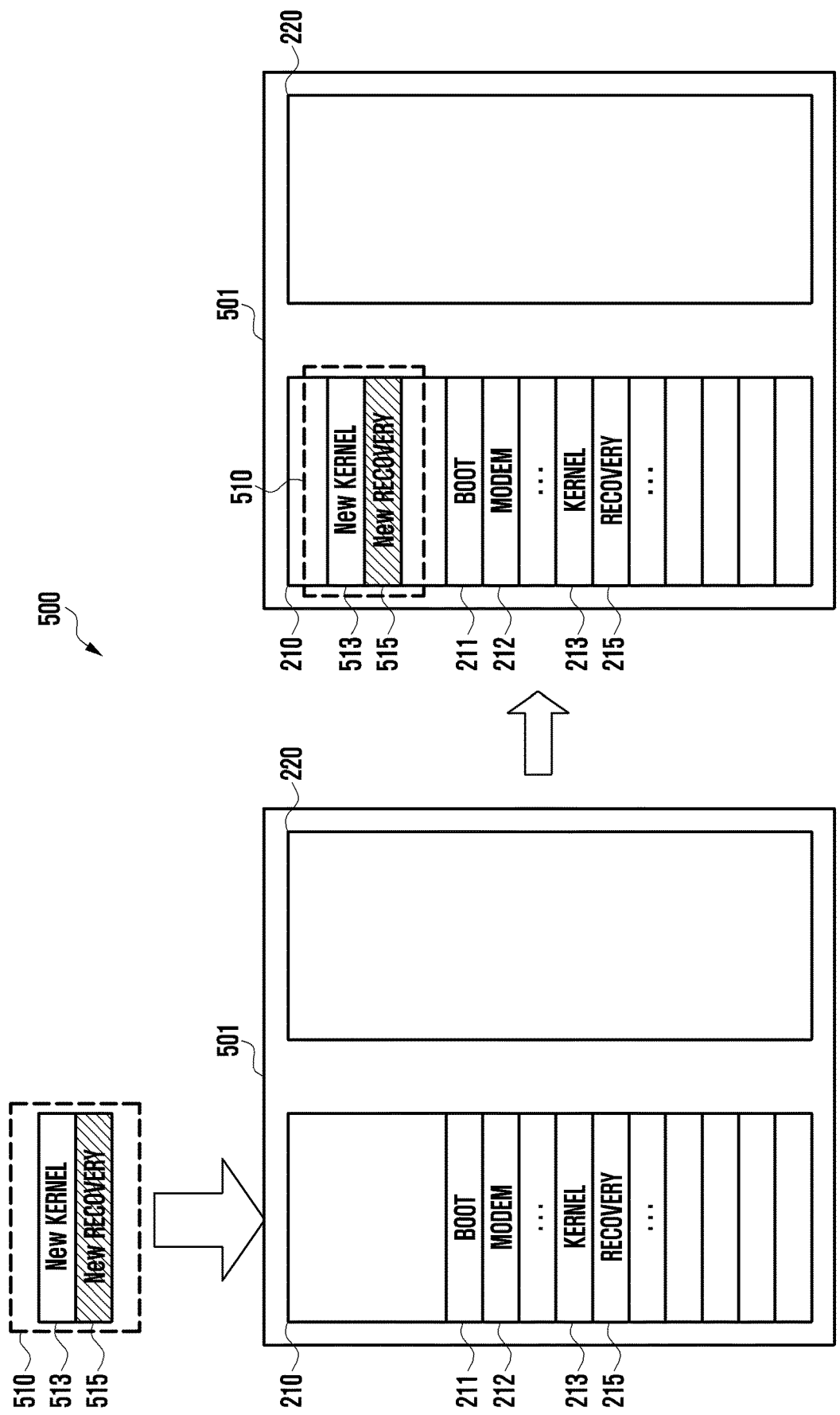
FIG. 5A to FIG. 5C are diagrams illustrating a method for controlling FOTA update of an electronic device according to various embodiments of the disclosure.
Figure 5B:
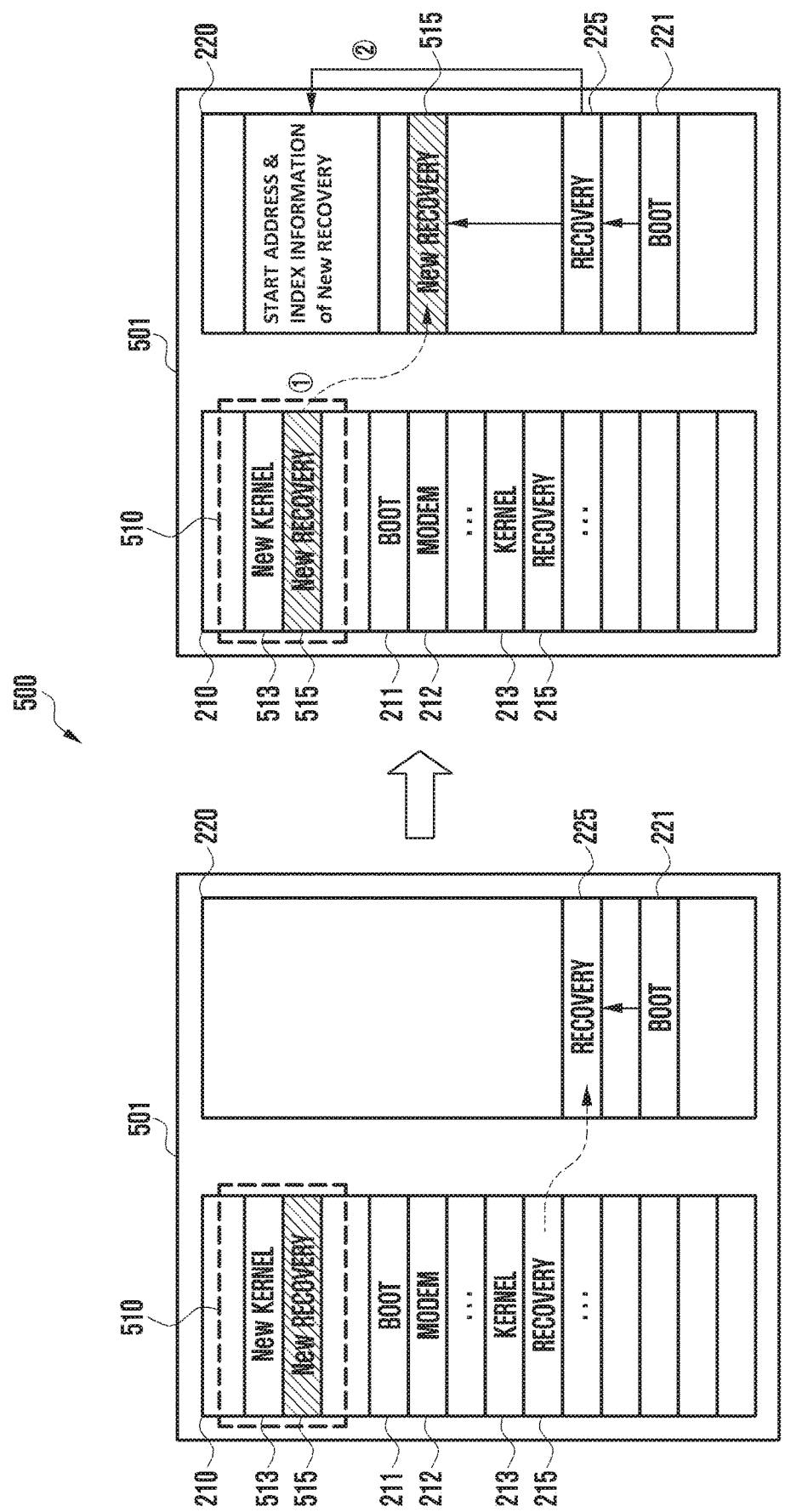
Figure 5C:
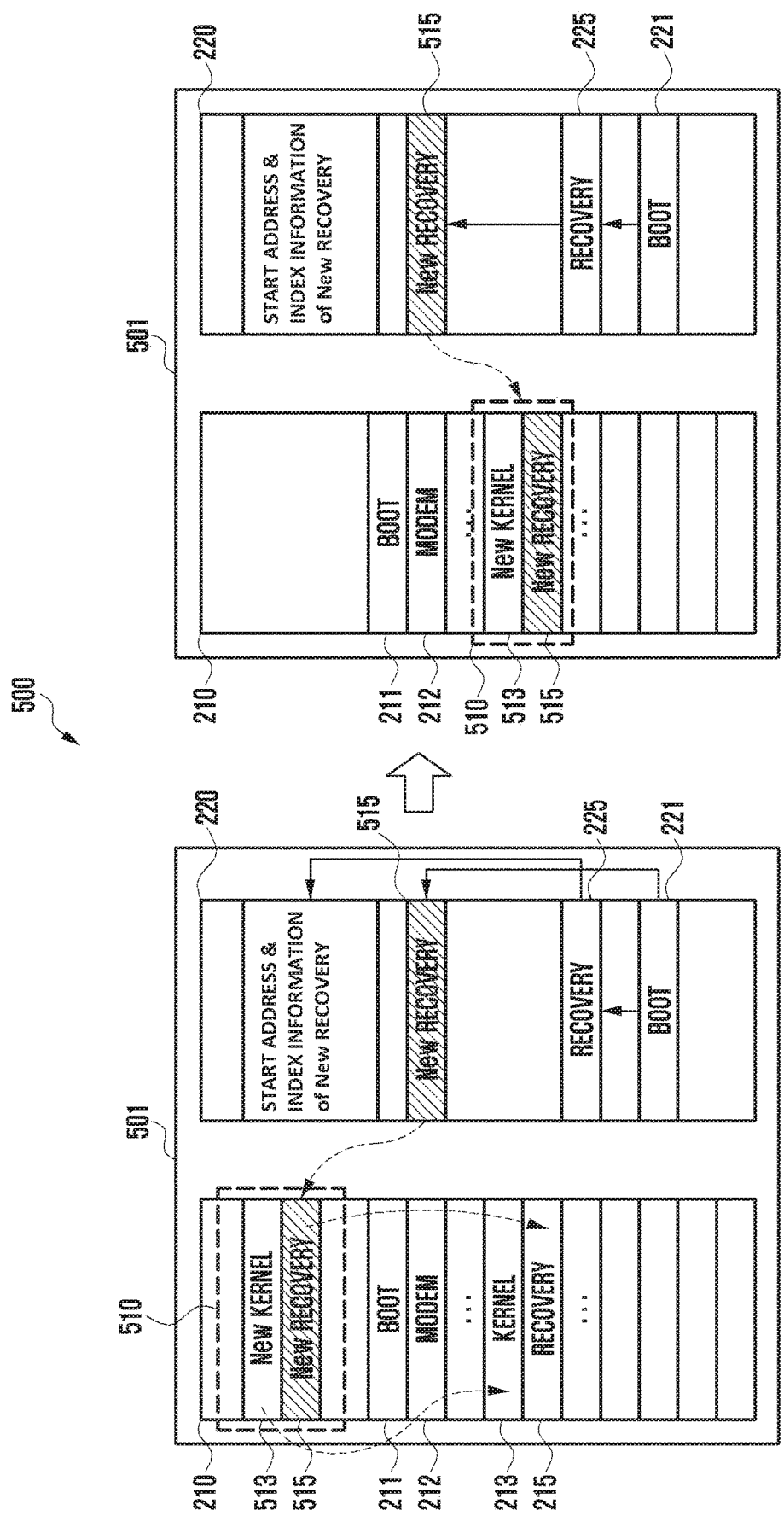

FIG. 5A to FIG. 5C are diagrams 500 illustrating a method for controlling FOTA update of an electronic device according to various embodiments of the disclosure. The embodiment shown in FIGS. 5A to 5C illustrates a process for efficiently controlling the FOTA update based on a new recovery when the new recovery is included new data.

Referring to FIG. 5A, a processor (e.g., the processor 120 of FIG. 1) of the electronic device 501 (e.g., the electronic device 101 of FIG. 1 or the electronic device 201 of FIG. 2) may download new data 510 from a server (e.g., a server supporting binary update, for example, the server 108 of FIG. 1). The new data 510 may include a new kernel 513 and a new recovery 515. The processor 120 may store the downloaded new data 510 in a nonvolatile memory 210 (e.g., the nonvolatile memory 210 of FIG. 2). The nonvolatile memory 210 may store a boot 211, a modem 212, a kernel 213, and a recovery 215 and may store the new data 510 in an area other than an area in which the boot 211, the modem 212, the kernel 213, and the recovery are stored.

Referring to FIG. 5B, the processor 120 of the electronic device 501 may be rebooted based on the recovery 215 to update the downloaded new data 510. In rebooting, the processor 120 may decompress the boot 211, the recovery 215, and the new recovery 515 included in the new data 510, which are stored in the nonvolatile memory 210, and may then load the same into the volatile memory 520. For example, the processor 120 may store a start address and index information corresponding to a memory area (e.g., a portion of the nonvolatile memory 220) in which the downloaded new data 510 is stored in a specific area of the memory (e.g., a portion of the volatile memory 220). While loading the recovery 215 into the volatile memory 220, the processor 120 may load the new recovery 515 into the volatile memory 220 based on the start address and the index information stored in the specific area.

According to various embodiments of the disclosure, the processor 120 may identify location information (e.g., coordinates) corresponding to the area (e.g., the portion of the nonvolatile memory 220) in which the new recovery 515 is stored in order to perform FOTA update based on the new recovery 515 included in the downloaded new data 510. When booted, the processor 120 may store flag (magic number) data and a start address and booting-related information of the new recovery 515 in a predefined address in the volatile memory 220 through the recovery 225 loaded into the volatile memory 220. The flag (magic number) data may be data for determining whether the new recovery 515 is stored.

According to various embodiments, the processor 120 may load the new recovery 515 into the volatile memory 220 through the recovery 225 and may store at least some of the flag (magic number) data and the start address and the booting-related information of the new recovery 515 in the predefined address in the volatile memory 220 based on the loaded new recovery 515. The processor 120 may perform a warm reset. The warm reset may be a method of resetting a system without deleting data stored in the volatile memory 220. Referring to FIG. 5C, when performing the warm reset, the processor 120 may identify whether the stored flag data is stored through the boot 221 and the recovery 225. When there is the flag data, the processor 120 may perform FOTA update corresponding to the new recovery 515 based on the start address of the new recovery 515. When there is no flag data, the processor 120 may be booted through the boot 221 and the recovery 225. According to various embodiments, the processor 120 may identify whether the new recovery 515 is stored through the flag data and may then delete the flag data to prevent an infinite loop caused by the flag data.

According to various embodiments, the processor 120 may update the new data 510 stored in the nonvolatile memory 210 based on the new recovery 515. For example, the processor 120 may update the kernel 213 and the recovery 215 stored in the nonvolatile memory 210 to the new kernel 513 and the new recovery 515 using the new recovery 515 loaded into the volatile memory 220. According to various embodiments, the processor 120 may delete the recovery 225 loaded into the volatile memory 220 and may update the kernel 213 and the recovery 215 stored in the nonvolatile memory 210 based on the new recovery 515 loaded into the volatile memory 220. The processor 120 may delete the kernel 213 and the recovery 215 stored in the nonvolatile memory 210 and may install the new kernel 513 and the new recovery 515. The electronic device 501 may be rebooted to complete the FOTA update, and may load the updated new kernel 513 into the volatile memory 520 and may be booted based on the loaded new kernel 513 in rebooting.

According to various embodiments, the processor 120 may perform the FOTA update based on the new recovery 515 loaded into the volatile memory 220 without performing a warm reset. For example, the processor 120 may transfer the authority of the recovery 225 to the new recovery 515 (e.g., the new recovery 515 loaded into the volatile memory 220) without a warm reset and may immediately perform the FOTA update based on the new recovery 515.

An electronic device according to various embodiments of the disclosure may include: a first memory 210 configured to include a boot area 211, a kernel area 213, and a recovery area 215; a second memory 220 configured to load data corresponding to at least one of the boot area 211, the kernel area 213, and the recovery area 215 included in the first memory; a communication module (e.g., the communication module 190 of FIG. 1); and a processor (e.g., the processor 120 of FIG. 1) configured to be electrically connected to the communication module, the first memory 210, and the second memory 220, wherein the first memory 210 may be executed to cause the processor 120 to: download data 510 to the first memory 210 through the communication module 190; perform rebooting upon request for update of the downloaded data 510; identify whether the downloaded data 510 includes recovery data 515 in a new version in the rebooting; load the recovery data 515 in the new version into the second memory 220 when the data includes the recovery data 515 in the new version; and update the downloaded data 510 based on the loaded recovery data 515 in the new version.

According to various embodiments, the processor 120 may load the recovery data included in the downloaded data 510 into the second memory 220 upon the request for the update of the downloaded data 510 and may perform a warm reset in which the recovery data loaded into the second memory 220 is not deleted.

According to various embodiments, the warm reset may maintain storage of the recovery data loaded into a specified area of the second memory 220 and may initialize a remaining area of the second memory 220 other than the specified area.

According to various embodiments, the processor 120 may determine whether to perform the update using the recovery data in the new version when the downloaded data includes the recovery data in the new version and may update the downloaded data based on the recovery data in the new version when the update is performed.

According to various embodiments, the processor 120 may connect to a server 108 through the communication module 190, may identify a specified area in the first memory 210, may download the data from the connected server 108, and may store the downloaded data in the identified specified area.

According to various embodiments, the first memory 210 may be a nonvolatile memory, and the second memory 220 may be a volatile memory.

According to various embodiments, the processor 120 may identify an area in which the recovery data 515 in the new version is stored in the second memory 220 when the data includes the recovery data 515 in the new version and may update the data using the recovery data 515 in the new version based on the identified area.

According to various embodiments, the processor 120 may identify whether the data includes the recovery data 515 in the new version in the rebooting when power is off, may load the recovery data 515 in the new version into the second memory 220 when the data includes the recovery data 515 in the new version, and may update the downloaded data based on the loaded recovery data 515 in the new version.

According to various embodiments, the data may include at least one of kernel data and recovery data, and the processor 120 may update at least one of the kernel data and the recovery data based on the recovery data 515 in the new version loaded into the second memory.

According to various embodiments, the processor 120 may update the downloaded data based on recovery data stored in the first memory 210 when the downloaded data does not include the recovery data 515 in the new version.

Figure 6:
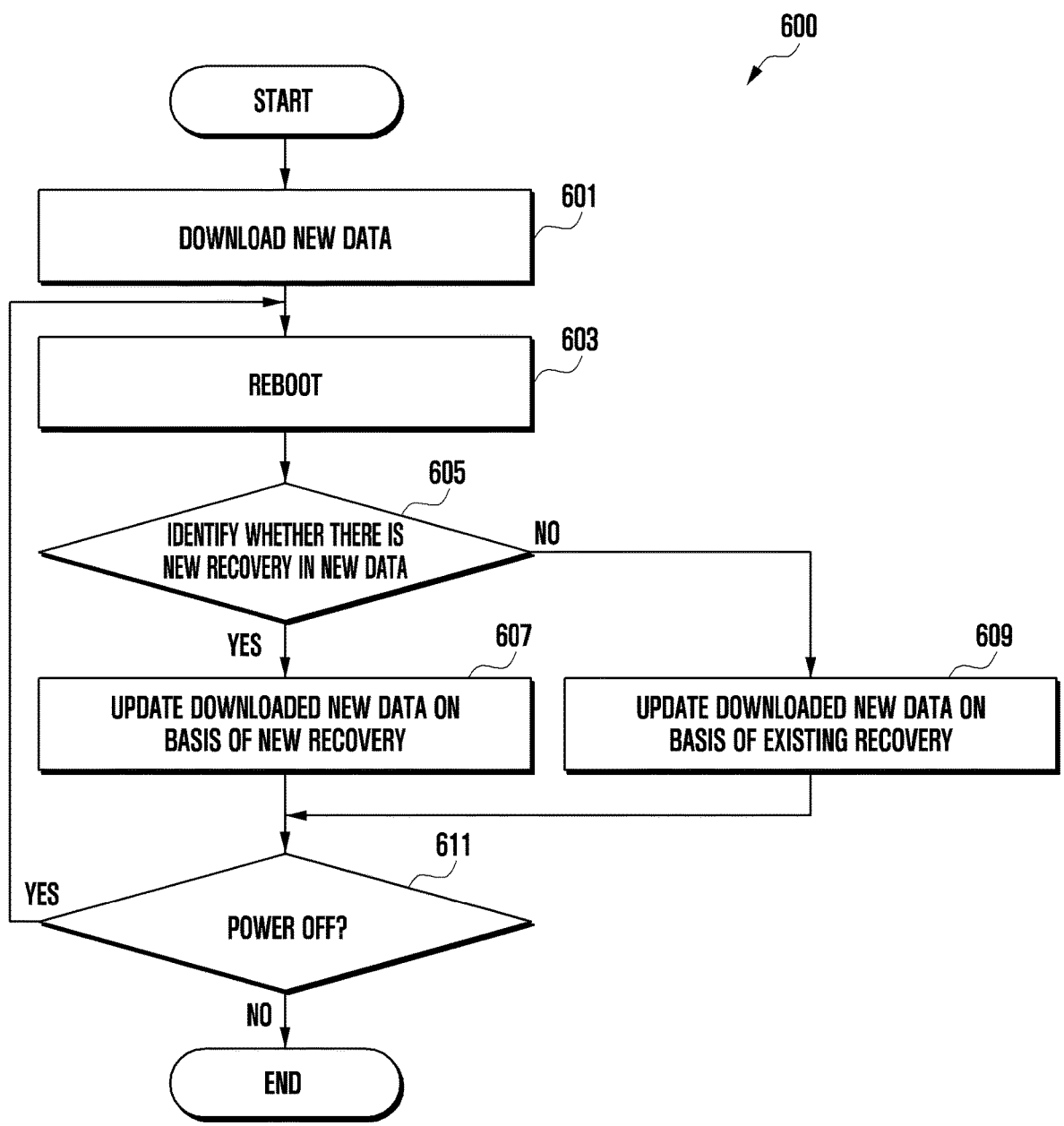
FIG. 6 is a flowchart illustrating a method for dealing with a case where power is off during FOTA update of an electronic device according to various embodiments of the disclosure.

FIG. 6 is a flowchart illustrating a method for dealing with a case where power is off during FOTA update of an electronic device according to various embodiments of the disclosure.

Referring to FIG. 6, operation 601 to operation 609 may be the same as operation 401 to operation 409 of FIG. 4. A description operation 601 to operation 609 is replaced with that of operation 401 to operation 409 of FIG. 4.

A processor (e.g., the processor 120 of FIG. 1) may update new data in operation 607 to operation 609, and power may be off in operation 611 while updating the new data. When the power is off before the update is completed, the update may be suspended. The processor 120 may return to operation 603 to properly complete the update.

According to various embodiments of the disclosure, when power is off during FOTA update, the electronic device 101 may return to a rebooting process before the update. In various embodiments of the disclosure, update may be performed according to FOTA even when power is off.

FIG. 7 is a flowchart specifically illustrating a method for dealing with a case where power is off during FOTA update of an electronic device according to various embodiments of the disclosure.

Referring to FIG. 7, in operation 701, a processor (e.g., the processor 120 of FIG. 1) of an electronic device (e.g., the electronic device 101 of FIG. 1) may download new data from a server (e.g., a server supporting binary update, for example, the server 108 of FIG. 1). While downloading the new data, the electronic device 101 may be powered off in operation 703. According to various embodiments of the disclosure, the time at which the power is off is not limited.

When the power is turned off, the electronic device 101 may be rebooted in operation 705, may download the new data again, and may perform FOTA update based on the downloaded new data.

In operation 707, the processor 120 of the electronic device 101 may load a recovery included in the new data into a volatile memory (e.g., the volatile memory 132 of FIG. 1). According to various embodiments, the processor 120 may perform a warm reset in order to perform the FOTA update using the recovery loaded into the volatile memory. The warm reset may be a method of resetting a system without deleting data stored in the volatile memory 132.

In operation 709, the processor 120 may perform the warm reset. After performing the warm reset, the processor 120 may determine whether the recovery loaded into the volatile memory 132 is a new recovery in operation 711. For example, the processor 120 may identify flag data corresponding to the recovery loaded into the volatile memory 132 and may determine whether the recovery is a new recovery based on the identified flag data. According to various embodiments of the disclosure, after determining whether the recovery is a new recovery, the processor 120 may delete the flag data to prevent an infinite loop caused by the flag data.

When the loaded recovery is a new recovery, the processor 120 may update the downloaded new data based on the new recovery in operation 713. According to various embodiments of the disclosure, the processor 120 may perform the FOTA update using the new recovery included in the new data.

When the loaded recovery is not a new recovery, the processor 120 may update the downloaded new data based on a defined recovery in operation 715.

According to various embodiments, the processor 120 may perform the FOTA update based on the new recovery loaded into the volatile memory 132 without performing a warm reset. For example, the processor 120 may transfer the authority of the recovery to the new recovery (e.g., the new recovery loaded into the volatile memory 132) without a warm reset and may immediately perform the FOTA update based on the new recovery.

According to another embodiment, the processor 120 may determine whether to perform update based on the new recovery at the time of loading the recovery into the volatile memory 132 in operation 707. When the update based on the new recovery is performed, the processor 120 may perform the update according to FOTA using the new recovery included in the loaded recovery. When the update based on the new recovery is not performed, the processor 120 may perform the update according to FOTA using the defined recovery.

A method for controlling update of an electronic device according to various embodiments of the disclosure may include: downloading data from a server 108 based on a first memory 210; performing rebooting upon request for update of the downloaded data; identifying whether the downloaded data includes recovery data 515 in a new version in the rebooting; loading the recovery data 515 in the new version into a second memory 220 when the data includes the recovery data 515 in the new version; and updating the downloaded data based on the loaded recovery data 515 in the new version.

According to various embodiments, the performing of the rebooting may include: loading the recovery data included in the downloaded data into the second memory 220 upon the request for the update of the downloaded data; and performing a warm reset in which the recovery data loaded into the second memory 220 is not deleted.

According to various embodiments, the warm reset may maintain storage of the recovery data loaded into a specified area of the second memory 220 and may initialize a remaining area of the second memory 220 other than the specified area.

According to various embodiments, the method may further include: determining whether to perform the update using the recovery data in the new version when the downloaded data includes the recovery data in the new version; and updating the downloaded data based on the recovery data in the new version when the update is performed.

According to various embodiments, the downloading of the data from the server may include: connecting to the server 108 through a communication module 190; identifying a specified area in the first memory 210; downloading the data from the connected server 108; and storing the downloaded data in the identified specified area.

According to various embodiments, the method may further include: identifying an area in which the recovery data 515 in the new version is stored in the second memory 220 when the data includes the recovery data 515 in the new version; and updating the data using the recovery data 515 in the new version based on the identified area.

According to various embodiments, the method may further include: identifying whether the data includes the recovery data 515 in the new version in the rebooting when power is off; loading the recovery data 515 in the new version into the second memory 220 when the data includes the recovery data 515 in the new version; and updating the downloaded data based on the loaded recovery data 515 in the new version.

According to various embodiments, the method may further include: updating the downloaded data based on recovery data stored in the first memory 210 when the downloaded data does not include the recovery data 515 in the new version.

A computer-readable recording medium according to various embodiments of the disclosure may store a program to perform a method that includes: downloading data from a server 108 based on a first memory 210; performing rebooting upon request for update of the downloaded data; identifying whether the downloaded data includes recovery data 515 in a new version in the rebooting; loading the recovery data 515 in the new version into a second memory 220 when the data includes the recovery data 515 in the new version; and updating the downloaded data based on the loaded recovery data 515 in the new version.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a first memory comprising a boot area, a kernel area, and a recovery area;
a second memory to load data corresponding to at least one of the boot area, the kernel area, and the recovery area in the first memory;
a communication module; and
a processor electrically connected to the communication module, the first memory, and the second memory,
wherein the first memory comprises instructions that, when executed, cause the processor to:
download the data to the first memory through the communication module,
perform rebooting upon request to update the downloaded data,
identify whether the downloaded data comprises recovery data in a new version of data previously stored in the first memory in the rebooting,
load the recovery data in the new version into the second memory when the downloaded data comprises the recovery data in the new version,
update the downloaded data based on the recovery data in the new version,
determine whether to perform the update using the recovery data in the new version when the downloaded data comprises the recovery data in the new version,
update the downloaded data based on the recovery data in the new version when the update is performed, and
update the downloaded data based on recovery data stored in the first memory when the downloaded data does not comprise the recovery data in the new version.

2. The electronic device as claimed in claim 1, wherein the first memory further comprises instructions that, when executed, cause the processor to:
load the recovery data comprised in the downloaded data into the second memory upon the request for the update of the downloaded data; and
perform a warm reset in which the recovery data loaded into the second memory is not deleted.

3. The electronic device as claimed in claim 2, wherein the warm reset maintains storage of the recovery data loaded into a specified area of the second memory and initializes a remaining area of the second memory other than the specified area.

4. The electronic device as claimed in claim 1, wherein the first memory further comprises instructions that, when executed, cause the processor to:
connect to a server through the communication module;
identify a specified area in the first memory;
download the data from the connected server; and
store the downloaded data in the identified specified area.

5. The electronic device as claimed in claim 1, wherein the first memory is a nonvolatile memory, and the second memory is a volatile memory.

6. The electronic device as claimed in claim 1, wherein the first memory further comprises instructions that, when executed, cause the processor to:
identify an area in which the recovery data in the new version is stored in the second memory when the downloaded data comprises the recovery data in the new version; and
update the downloaded data using the recovery data in the new version based on the identified area.

7. The electronic device as claimed in claim 1, wherein the first memory further comprises instructions that, when executed, cause the processor to:
identify whether the downloaded data comprises the recovery data in the new version in the rebooting;
load the recovery data in the new version into the second memory when the downloaded data comprises the recovery data in the new version; and
update the downloaded data based on the loaded recovery data in the new version.

8. The electronic device as claimed in claim 1, wherein the data comprises at least one of kernel data and the recovery data, and
the first memory further comprises instructions that, when executed, cause the processor to update at least one of the kernel data and the recovery data based on the recovery data in the new version loaded into the second memory.

9. A method for controlling update of an electronic device, the method comprising:
downloading data from a server based on a first memory;
performing rebooting upon request to update the downloaded data;
identifying whether the downloaded data comprises recovery data in a new version of data previously stored in the first memory in the rebooting;
loading the recovery data in the new version into a second memory when the downloaded data comprises the recovery data in the new version;
updating the downloaded data based on the recovery data in the new version;
determining whether to perform the update using the recovery data in the new version when the downloaded data comprises the recovery data in the new version;

updating the downloaded data based on the recovery data in the new version when the update is performed, and updating the downloaded data based on recovery data stored in the first memory when the downloaded data does not comprise the recovery data in the new version.

10. The method as claimed in claim 9, wherein the performing of the rebooting comprises:

loading the recovery data comprised in the downloaded data into the second memory upon the request for the update of the downloaded data; and performing a warm reset in which the recovery data loaded into the second memory is not deleted.

11. The method as claimed in claim 9, wherein the downloading of the data from the server comprises:

connecting to the server through a communication module;

identifying a specified area in the first memory;

downloading the data from the connected server; and storing the downloaded data in the identified specified area.

12. The method as claimed in claim 9, further comprising:

identifying an area in which the recovery data in the new version is stored in the second memory when the downloaded data comprises the recovery data in the new version; and updating the data using the recovery data in the new version based on the identified area.

13. The method as claimed in claim 9, further comprising:

identifying whether the downloaded data comprises the recovery data in the new version in the rebooting;

loading the recovery data in the new version into the second memory when the downloaded data comprises the recovery data in the new version; and updating the downloaded data based on the loaded recovery data in the new version.

* * * * *